Patented Nov. 29, 1932

1,889,123

UNITED STATES PATENT OFFICE

JOHN H. JONES, OF BOUND BROOK, NEW JERSEY, ASSIGNOR TO THE BEST FOODS, INC., OF NEW YORK, N. Y., A CORPORATION OF NEW JERSEY

TREATMENT OF PIMIENTOS

No Drawing. Application filed September 19, 1930. Serial No. 483,134.

This invention relates to the preparation of pimientos for use in the production of food products, and, more particularly, for the preservation of the pimientos during storage and transportation.

It is the usual practice in the preparation of pimientos to put them through a decorticating furnace, wherein they are subjected to an intense heat for a sufficient length of time to scorch the skin without damaging the meat of the fruit. The seeds and scorched skin are then removed and after washing the fruit it is packed in cans which are sealed and heated to a sterilizing temperature.

The canning of the pimientos is an expensive operation, and it is an object of the present invention to provide a method for preserving the fruit and to thereby avoid the necessity of such canning. It is a further object to preserve the pimiento in such manner that it may be removed from the preserving solution and used directly in the preparation of food products, such as relishes. Other objects will become apparent.

In carrying out my improved process, the pimientos, after being subjected to the decorticating, washing and cleaning steps described above, are placed in a cooker and acetic acid and salt are added in the following proportions: To 80 lbs. pimientos, 12 lbs. of 24% acetic acid solution and 8 lbs. salt are added. The cooker is then heated until the mixture is brought to a temperature of about 180 to 200° F., and is maintained at this temperature about 15 minutes, or until the pimientos become slightly soft, after which the mixture is cooled quickly and placed in barrels. The pimientos treated in this manner and submerged in the vinegar and salt solution may be stored in open vessels for months without deterioration.

During the above treatment the pimientos absorb salt and acetic acid by osmosis and when removed from the barrel they contain about three to three and one-half percent of acetic acid, and about six to eight percent of salt.

This product may be used directly in the preparation of relishes and salad dressing where the absorbed ingredients are needed as seasoning materials. If it is desired to use the pimientos in the preparation of food products in which the salt and acetic acid would be objectionable, the salt and acetic acid may be washed from the fruit with water.

The acetic acid is added preferably in the form of vinegar, for example, as wine vinegar, and if additional acetic acid is required to give the proper acid concentration, the vinegar may be fortified by adding acetic acid. Also, the procedure may be carried out by heating the cleaned pimientos in an acetic acid or vinegar solution alone, after which the salt is added to the fruit as it is put into the barrels.

The particular proportions and procedure which have been described may be varied and it is not intended to restrict the invention to the particular embodiment given. The terms which have been employed are used in their descriptive sense and not as limiting the scope of the invention, it being intended to include within the scope of the appended claims all equivalents of the procedures and ingredients described.

What I claim is:

1. A method for treating pimientos comprising heating the pimientos in the presence of acetic acid and salt.

2. A method for preserving pimientos comprising heating them to a temperature of about 180 to 200° F. in the presence of acetic acid and salt.

3. A method for treating pimientos comprising removing the skin, washing the fruit and heating it in the presence of acetic acid and salt.

4. A method for treating pimientos comprising heating the pimientos in the presence of acetic acid and adding salt.

5. A method for treating pimientos comprising heating them in the presence of vinegar and salt.

6. A preserved pimiento containing absorbed acetic acid and salt.

7. A preserved pimiento containing about three to three and one-half percent of acetic acid and six to eight percent of salt.

In testimony whereof, I have signed my name to this specification this 9th day of September, 1930.

JOHN H. JONES.